Nov. 15, 1949  E. J. MASON  2,488,309
LIGHT WEIGHT-REINFORCED LOCKING SECTIONAL HANDLE
Filed Sept. 20, 1944
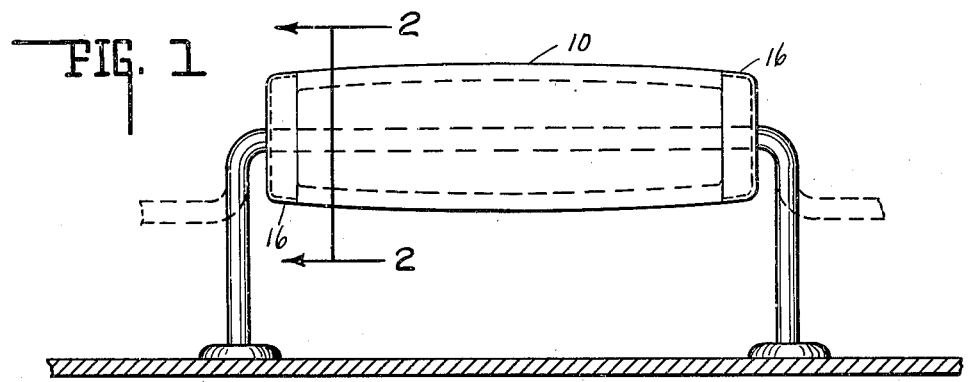
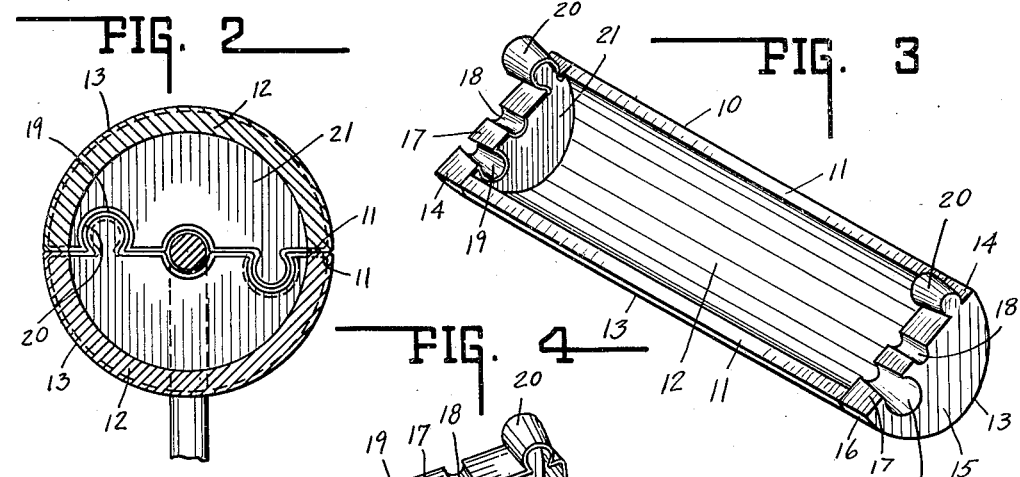
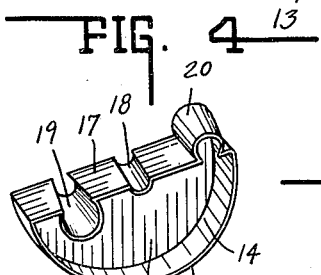
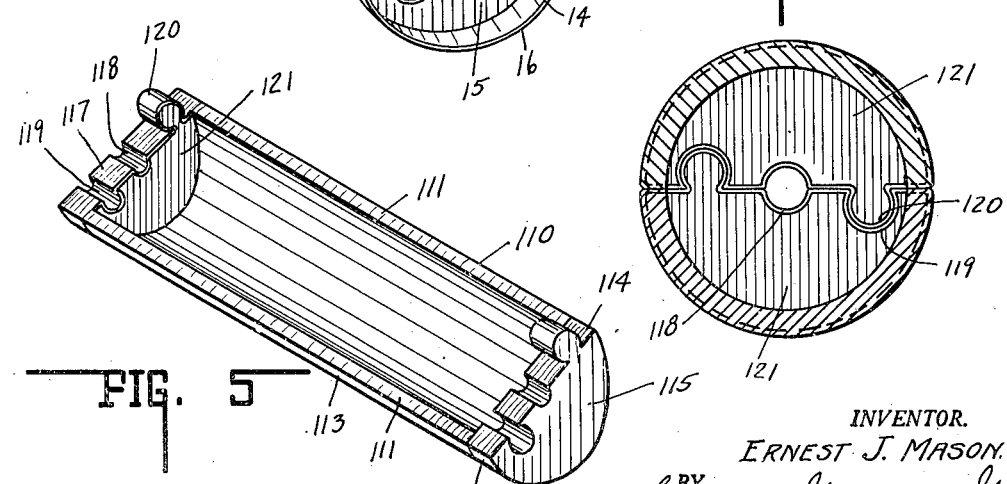
INVENTOR.
ERNEST J. MASON.
BY
Lockwood, Goldsmith & Galt.
ATTORNEYS.

Patented Nov. 15, 1949

2,488,309

UNITED STATES PATENT OFFICE 2,488,309

LIGHTWEIGHT-REINFORCED LOCKING SECTIONAL HANDLE

Ernest J. Mason, Marion, Ind.

Application September 20, 1944, Serial No. 554,947

11 Claims. (Cl. 16—125)

This invention relates generally to handles and more especially to handles for teakettles, coffee pots, pails and other containers having a wire or like bail and upon which is mounted a hand gripping portion termed a handle.

The present invention is directed to improvements upon the handles illustrated, described and claimed in Patent No. 2,319,147 dated May 11, 1943, and copending Patent No. 2,371,639 dated March 20, 1945, reissued as Reissue No. 22,749 dated April 30, 1946.

Both patent disclosures are directed to identical half handles, each having a bail groove, a locking tongue to one side thereof and a locking groove to the opposite side of the bail groove and a like distance therefrom, all grooves extending longitudinally of and coextensive with said handle, the half handles being assembled upon a bail or together by longitudinal end to end presentation of one to the other. The first patent is directed to a handle wherein the tongues and locking grooves are complementary and equal in cross-section throughout their length while the second patent is directed to a handle wherein the tongues and locking grooves are progressively tapered in cross-section for self-locking or wedge-locking purposes.

The present invention is applicable to either type of handle and is directed to a discontinuous locking arrangement thereby permitting of the formation of a hollow or tubular handle.

One chief feature of the present invention when embodied in molded handles is the provision of end cups at opposite ends which provide predetermined formations to be filled with handle forming material and which serve as molds for same in the handle formation. These included cups permit handle molding to be effected by molds that have the desired external handle conformation forming cavity and a smaller convex molding means that forms the central cavity in the handle and seals off the cups at their confronting inner concave faces. The cups preferably are formed as sheet metal stampings and may be of different metals or other material and formed by casting, molding or the like as well.

Each type handle, regardless of length or external conformation, requires but two end cups which are identical or similar. It will be obvious that production of either type handle is extremely facilitated by the present invention, and handle material cost is reduced by reason of the hollow character of the handle.

Other objects and features of the invention will be set forth more fully hereinafter.

The full nature of the invention will be understood from the accompanying drawings and the following description and claims:

In the drawings Fig. 1 is a side elevation of a handle embodying the invention applied to an offset portion of a bail (see certain dotted lines) or a coffee pot or smoothing iron (shown partly in section), see the full lines, said handle herein having a barrel-like conformation; that is of a greater diameter at the middle than at either end.

Fig. 2 is a central sectional view through the handle and handle support and is taken on line 2—2 of Fig. 1 and in the direction of the arrows.

Fig. 3 is a perspective view looking into one of the hollow half handles shown in Fig. 2.

Fig. 4 is a perspective view of an end cup in such a handle.

All the aforesaid illustrates the invention as applied to and incorporated in the second patent handle.

Fig. 5 is a perspective view similar to Fig. 3 and of the invention as applied to and incorporated in the first patent handle.

Fig. 6 is a transverse sectional view thereof and is similar to Fig. 2.

Since each of the aforesaid patents describes in detail the application of said handle to a bail or the like by end to end or longitudinal association of one-half handle to another with the bail included therebetween and the handle of the present invention is illustrated in applied position in Fig. 1, further reference thereto will be omitted and attention will be directed to the present half handle invention details and construction.

Each half handle of the second patent type includes a body portion having two parallel and coplanar faces 11, a cylindrical or similar inner concave surface 12 and a cylindrical, barrel or like shaped convex external surface 13.

At each end is a cup 14 having the end wall 15, defined by a semi-circular outlined flange 16 and the flat flange 17 connects the ends thereof. Herein the flat flange has a groove defining, depressed, semi-cylindrical portion 18 and spaced therefrom and parallel thereto is the semi-frusto-conical groove defining depression 19 and spaced a like distance oppositely from groove 18 is the upwardly projecting semi-frusto-conical projection forming portion 20 complementary to groove or depression 19.

In the production of the half handle illustrated the exterior mold in its cavity will seat at each end the two cups in the relation shown in Fig. 3. Then a measured amount of material is supplied and the plunger member will be advanced into the cavity mold to seal off partially each of the cups at the inner end thereof and form the barrel portion as well as fill said cups as at 21. Portions 11 and 21 are integral.

This is a pressure setting operation. The half handle can be made of plastic (synthetic resin) using the injection system of molding. Howsoever made, the result is a barrel shell with cup filled ferrule reenforced ends. This provides a hollow half handle, the interlocking portions of which are preformed and therefore accurate.

In Figs. 5 and 6 numerals of the one hundred series indicate like or equivalent parts similar to those in Figs. 1 to 4 inclusive and designated by the corresponding numbers of the primary series of numbers. The result is a hollow half handle having cup filled reenforced ends. The locking portions herein, however, instead of being semi-frusto-conical in character are semi-cylindrical in character.

Except for the exposure of the semi-circular band portions 16 and 116 and the end plates 15 and 115, the external appearance of the hollow handles herein are the same as the handles illustrated in the second and first patents aforesaid respectively.

Not only are the strain portions reenforced by the cups, but it is obvious the discontinuous type of connection only requires partial lapping of the half handles in longitudinal offset relation and then registration thereof by movement axially of the handle of but little more than the depth of the cup.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, each end closure comprising a cup member, same having their cavities confronting each other and each cup member includes the aforementioned groove, tongue and neck defining portions.

2. A handle structure as defined by claim 1 wherein the cup confronting cavities of each half handle nest the opposite ends of the body shell of that half handle and are rigidly secured thereto.

3. A reinforced hollow handle structure comprised of a pair of similar half handles, each half handle including a body shell and end closures at opposite ends of said shell, each closure having a central semi-cylindrical groove, these groves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, the tongues and grooves spaced from the central grooves each having a tapering form, the said aligned tapering tongues and tapering grooves being substantially identical respectively.

4. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, the end closures of each half handle being integral with the shell at the ends thereof, and the tongues and grooves spaced from the central grooves each being of tapering form, the said aligned tapering tongues and grooves being substantially identical respectively.

5. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, each end closure comprising a cup member, same having their cavities confronting each other and each cup member includes the aforementioned groove, tongue and neck defining portions, and each of the tongues and grooves spaced from the central grooves each being of tapering form.

6. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, each end closure comprising a cup member, same having their cavities confronting each other and each cup member includes the aforementioned groove, tongue and neck defining portions, and the tongues and grooves spaced from the central grooves each being of uniform cross-section throughout its length.

7. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, the end closures comprising portions integral with the shell at the ends of the shell and cup portions enclosing the integral portions, the cups confronting each other and each including the aforementioned groove, tongue and neck defining portions.

8. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, the end closures comprising portions integral with the shell at the ends of the shell and cup portions enclosing the integral portions, the cups confronting each other and each including the aforementioned groove, tongue and neck defining portions, and the tongues and grooves spaced from the central grooves each being of tapering form.

9. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck and neck is spaced therefrom and parallel to both, the last mentioned complementary grooves being longitudinally aligned, the end closures comprising portions integral with the shell at the ends of the shell and cup portions enclosing the integral portions, the cups confronting each other and each including the aforementioned groove, tongue and neck defining portions, and the tongues and grooves spaced from the central grooves each being of uniform cross-section throughout its length.

10. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, each closure being peripherally walled by a band formation.

11. A reinforced hollow handle structure comprised of a pair of similar half handles, each half handle including a body shell and end closures at opposite ends of said shell, each closure having a central semi-cylindrical groove, these grooves being longitudinally aligned, each closure having an outwardly projecting tongue with a reduced neck connection thereto and parallel to but spaced from the central groove, said tongues being longitudinally aligned and each closure having a groove complementary to said tongue and neck and spaced oppositely from the central groove the same distance as the tongue and neck is spaced therefrom and parallel to both, the last mentioned complementary grooves being longitudinally aligned, each closure being peripherally walled by a band formation having portions forming bearing surfaces for the semi-cylindrical groove, the tongue and neck, and the groove complementary thereto.

ERNEST J. MASON.

REFERENCES CITED

The following references are of record in the file of this patent:

UNITED STATES PATENTS

| Number | Name | Date |
| --- | --- | --- |
| 727,417 | McMahon | May 5, 1903 |
| 1,501,480 | Dye | July 15, 1924 |
| 1,730,820 | Holden | Oct. 8, 1929 |
| 2,102,839 | Dohrman | Dec. 21, 1937 |